(12) United States Patent
Veltrop (10) Patent No.: US 9,003,820 B2
(45) Date of Patent: Apr. 14, 2015

(54) POINT-OF-USE HOLDING CABINET

(75) Inventor: Loren Veltrop, Chicago, IL (US)

(73) Assignee: Prince Castle LLC, Carol Stream, IL (US)

( * ) Notice: Subject to any disclaimer, the term of this patent is extended or adjusted under 35 U.S.C. 154(b) by 1106 days.

(21) Appl. No.: 12/763,553

(22) Filed: Apr. 20, 2010

(65) Prior Publication Data

US 2011/0252813 A1 Oct. 20, 2011

(51) Int. Cl.
| F25D 23/06 | (2006.01) |
|---|---|
| A47J 36/24 | (2006.01) |
| F25B 21/02 | (2006.01) |
| F25D 31/00 | (2006.01) |
| A47B 31/02 | (2006.01) |
| A47J 39/00 | (2006.01) |

(52) U.S. Cl.
CPC .............. *A47J 36/2483* (2013.01); *F25B 21/02* (2013.01); *F25D 31/005* (2013.01); *A47J 39/006* (2013.01)

(58) Field of Classification Search
CPC .. A47B 2031/026; F25D 23/12; F25D 31/005
USPC .................................................... 62/229, 451
See application file for complete search history.

(56) References Cited

U.S. PATENT DOCUMENTS

| 2,386,919 | A | * | 10/1945 | Tobey | 62/442 |
|---|---|---|---|---|---|
| 2,900,806 | A | * | 8/1959 | Wurtz et al. | 62/186 |
| 2,934,913 | A | * | 5/1960 | Haines et al. | 62/161 |
| 3,042,384 | A | * | 7/1962 | Bauman | 165/42 |
| 3,275,393 | A | * | 9/1966 | Conklin et al. | 312/403 |
| 3,301,618 | A | * | 1/1967 | Feldser et al. | 312/111 |
| 3,308,633 | A | * | 3/1967 | Kritzer, Jr. | 62/239 |
| 3,414,709 | A | * | 12/1968 | Tricault | 219/411 |
| 3,696,720 | A | | 10/1972 | Vinson | |
| 3,950,632 | A | | 4/1976 | Rivelli | |
| 3,979,056 | A | | 9/1976 | Barnes | |
| 4,036,995 | A | | 7/1977 | Koether et al. | |
| 4,077,690 | A | | 3/1978 | Koether | |
| 4,278,872 | A | | 7/1981 | Koether et al. | |
| 4,306,616 | A | * | 12/1981 | Woods et al. | 165/136 |
| 4,355,521 | A | * | 10/1982 | Tsai | 62/196.4 |

(Continued)

FOREIGN PATENT DOCUMENTS

| JP | 8000414 | 1/1996 |
|---|---|---|
| JP | 10079088 | 3/1998 |

(Continued)

OTHER PUBLICATIONS

Reider, Thomas. How to Say What Stuff Looks Like. Ontario, Canada: Marcus Books, 1995. p. 62. as cited in applicant's arguments, p. 12, submitted Mar. 31, 2014.*

(Continued)

*Primary Examiner* — Ljiljana Ciric
*Assistant Examiner* — Alexis Cox
(74) *Attorney, Agent, or Firm* — Marshall, Gerstein & Borun LLP (57) ABSTRACT

A point-of-use food holding cabinet keeps food products hot and cold in different compartments, which are heated and refrigerated respectively. The refrigerated compartment is kept cold using a conventional refrigeration device. The heated compartment is kept hot using an electrically-resistive heater wire. One compartment or shelf of a holding cabinet can be refrigerated while an adjacent compartment can be kept warm.

9 Claims, 6 Drawing Sheets

(56) References Cited

U.S. PATENT DOCUMENTS

| | | | |
|---|---|---|---|
| 4,388,689 A | 6/1983 | Hayman et al. | |
| 4,530,067 A | 7/1985 | Dorr | |
| 4,569,421 A | 2/1986 | Sandstedt | |
| 4,610,238 A | 9/1986 | Veth | |
| 4,633,230 A * | 12/1986 | Tam | 340/521 |
| 4,644,931 A | 2/1987 | Veth | |
| 4,688,475 A | 8/1987 | Witt et al. | |
| 4,740,888 A | 4/1988 | Ceste, Sr. et al. | |
| 4,742,455 A | 5/1988 | Schreyer | |
| 4,782,445 A | 11/1988 | Pasquini | |
| 4,812,625 A | 3/1989 | Ceste, Sr. | |
| 4,812,963 A | 3/1989 | Albrecht et al. | |
| 4,864,498 A | 9/1989 | Pasquini et al. | |
| 4,911,068 A | 3/1990 | Koether et al. | |
| 4,922,435 A | 5/1990 | Cahlander et al. | |
| 5,003,472 A | 3/1991 | Perrill et al. | |
| 5,069,273 A * | 12/1991 | O'Hearne | 165/206 |
| 5,093,556 A | 3/1992 | Oelfke | |
| 5,128,862 A | 7/1992 | Mueller | |
| 5,132,914 A | 7/1992 | Cahlander et al. | |
| 5,172,328 A | 12/1992 | Cahlander et al. | |
| 5,188,020 A | 2/1993 | Buchnag | |
| 5,216,918 A | 6/1993 | Landis et al. | |
| 5,218,527 A | 6/1993 | Ishikawa et al. | |
| 5,247,807 A | 9/1993 | Jarman et al. | |
| 5,253,564 A | 10/1993 | Rosenbrock et al. | |
| 5,357,426 A | 10/1994 | Morita et al. | |
| D364,530 S | 11/1995 | Robards, Jr. et al. | |
| 5,485,780 A | 1/1996 | Koether et al. | |
| 5,504,589 A | 4/1996 | Montague et al. | |
| 5,510,979 A | 4/1996 | Moderi et al. | |
| 5,539,671 A | 7/1996 | Albrecht et al. | |
| 5,553,312 A | 9/1996 | Gattey et al. | |
| 5,579,952 A | 12/1996 | Fiedler et al. | |
| 5,590,586 A | 1/1997 | Ulfig et al. | |
| 5,594,222 A | 1/1997 | Caldwell | |
| 5,616,269 A | 4/1997 | Fowler et al. | |
| 5,653,906 A | 8/1997 | Fowler et al. | |
| 5,724,886 A | 3/1998 | Ewald et al. | |
| 5,772,072 A | 6/1998 | Prescott | |
| 5,812,393 A | 9/1998 | Drucker | |
| 5,900,173 A | 5/1999 | Robards, Jr. | |
| 5,921,096 A | 7/1999 | Warren | |
| 5,931,083 A | 8/1999 | Stanger et al. | |
| 5,939,974 A | 8/1999 | Heagle et al. | |
| 5,944,324 A * | 8/1999 | Schultheis et al. | 277/637 |
| 5,947,012 A | 9/1999 | Ewald et al. | |
| 6,000,622 A | 12/1999 | Tonner et al. | |
| 6,006,996 A | 12/1999 | Bhatnagar | |
| 6,011,243 A | 1/2000 | Arnold et al. | |
| 6,026,372 A | 2/2000 | Savage | |
| 6,031,208 A | 2/2000 | Witt et al. | |
| 6,052,667 A | 4/2000 | Walker et al. | |
| D427,008 S | 6/2000 | Wasner | |
| D427,479 S | 7/2000 | Wasner | |
| 6,088,681 A | 7/2000 | Coleman et al. | |
| 6,114,659 A | 9/2000 | Finck et al. | |
| 6,116,154 A | 9/2000 | Vaseloff | |
| 6,119,587 A | 9/2000 | Ewald et al. | |
| 6,153,244 A | 11/2000 | Stanger et al. | |
| 6,158,885 A | 12/2000 | Landis | |
| 6,175,099 B1 | 1/2001 | Shei et al. | |
| 6,200,944 B1 | 3/2001 | Dovey et al. | |
| 6,209,447 B1 | 4/2001 | Ewald et al. | |
| 6,257,010 B1 * | 7/2001 | Shei et al. | 62/252 |
| 6,261,621 B1 | 7/2001 | Stanger et al. | |
| 6,262,394 B1 | 7/2001 | Shei et al. | |
| 6,412,403 B1 | 7/2002 | Veltrop | |
| 6,434,961 B2 | 8/2002 | Richmond et al. | |
| 6,502,411 B2 * | 1/2003 | Okamoto | 62/129 |
| 6,541,739 B2 | 4/2003 | Shei et al. | |
| 6,637,322 B2 | 10/2003 | Veltrop | |
| 6,658,994 B1 | 12/2003 | McMillan | |
| 6,825,447 B2 | 11/2004 | Kim et al. | |
| 6,834,276 B1 | 12/2004 | Jensen et al. | |
| 6,878,391 B2 | 4/2005 | Veltrop | |
| 6,884,451 B2 | 4/2005 | Veltrop | |
| 7,028,498 B2 | 4/2006 | Monroe et al. | |
| 7,105,779 B2 | 9/2006 | Shei | |
| 7,132,926 B2 | 11/2006 | Vaseloff et al. | |
| 7,227,102 B2 | 6/2007 | Shei | |
| 7,235,762 B2 | 6/2007 | Gagas et al. | |
| 7,258,064 B2 | 8/2007 | Vaseloff et al. | |
| 7,279,659 B2 | 10/2007 | Gagas et al. | |
| 7,328,654 B2 | 2/2008 | Shei | |
| RE40,151 E | 3/2008 | Shei et al. | |
| RE40,290 E | 5/2008 | Shei et al. | |
| 7,376,485 B2 | 5/2008 | Salerno | |
| D570,715 S | 6/2008 | Di Federico | |
| 7,381,927 B1 | 6/2008 | Agnello | |
| 7,446,282 B2 | 11/2008 | Shei et al. | |
| 7,628,107 B2 | 12/2009 | Vaseloff et al. | |
| 8,247,745 B2 | 8/2012 | Chung et al. | |
| 2001/0053963 A1 * | 12/2001 | Kim et al. | 702/188 |
| 2004/0000162 A1 | 1/2004 | Song | |
| 2004/0016242 A1 * | 1/2004 | Song et al. | 62/132 |
| 2004/0019534 A1 * | 1/2004 | Callahan et al. | 705/27 |
| 2004/0060320 A1 * | 4/2004 | Roh et al. | 62/441 |
| 2005/0236947 A1 | 10/2005 | LeClear et al. | |
| 2006/0150662 A1 | 7/2006 | Lee et al. | |
| 2007/0017245 A1 | 1/2007 | Song et al. | |
| 2007/0144202 A1 | 6/2007 | Theodos et al. | |
| 2007/0251397 A1 | 11/2007 | Dorsten et al. | |
| 2008/0213449 A1 | 9/2008 | Wisner et al. | |
| 2009/0045185 A1 | 2/2009 | Schroeder et al. | |
| 2009/0309027 A1 | 12/2009 | Von Striver | |
| 2010/0205992 A1 | 8/2010 | Morris | |
| 2011/0030565 A1 * | 2/2011 | Shei | 99/329 P |
| 2012/0285942 A1 * | 11/2012 | Godecker et al. | 219/201 |
| 2014/0150461 A1 * | 6/2014 | Veltrop | 62/3.6 |
| 2014/0165644 A1 * | 6/2014 | Veltrop | 62/440 |
| 2014/0174101 A1 * | 6/2014 | Veltrop | 62/3.6 |
| 2014/0197177 A1 * | 7/2014 | Veltrop et al. | 220/573.1 |

FOREIGN PATENT DOCUMENTS

| | | |
|---|---|---|
| JP | 11342061 | 12/1999 |
| WO | 0131533 | 5/2001 |
| WO | 2005034633 | 4/2005 |

OTHER PUBLICATIONS

Frymaster HCP Installation and Operation Manual, Dec. 2006, pp. 1-1 to 10-4, title page and table of contents; publisher, Enodis, Frymaster LLC, Shreveport, LA.

Non-Final Office Action issued for U.S. Appl. No. 12/782,843 on Aug. 21, 2012.

Frymaster HCP Installation and Operation Manual, Dec. 2006, pp. 1-1 to 10-4, title page and table of contents; publisher, Enodis, Frymaster LLC, Shreveport, L.

Prince Castle LLC, Holding Panels (www.princecastle.com).

Prince Castle LLC, Holding Bins (www.princecastle.com).

Thermodyne Food Products, Inc., Counter Top Holding Oven Model 300 NDNL specification.

Final Office Action issued for U.S. Appl. No. 12/782,843 on Dec. 31, 2012, USPTO.

Non-Final Office Action issued for U.S. Appl. No. 12/782,843 on Jun. 19, 2013, USPTO.

Non-Final Office Action issued for U.S. Appl. No. 13/567,821 on Feb. 8, 2013, USPTO.

Final Office Action issued for U.S. Appl. No. 13/567,821 on Jun. 6, 2013, USPTO.

* cited by examiner

POINT-OF-USE HOLDING CABINET

BACKGROUND

Many restaurants' success depends on how quickly customers can be served with food items that a customer orders and on the quality of the food when it is served. If the rate at which a restaurant prepares food products equals the rate at which those same food products are ordered and sold, a restaurant can theoretically have freshly-prepared foods ready to serve for customers as they arrive. Since it is not always possible to match food production with customer ordering rates, and since certain fast food restaurant customers expect to receive their ordered food items quickly, many fast food restaurants prepare various food items and keep them ready for sale until a customer arrives and purchases a pre-cooked food item.

Holding ovens to keep food warm are well known. Many such ovens allow a cooked food item to be put into the oven from one side of the oven and taken from the oven on the opposite side whereby food preparers add food to the oven and food servers take food from the oven.

While food holding ovens are well known and enable a restaurant service provider to keep food warm until served, a refrigerated food holding cabinet that provides the same or nearly the same functionality might enable a restaurant to keep prepared foods cold until they are ready for consumption. A refrigerated, point-of-use holding cabinet would therefore be an improvement over the prior art. Such a cabinet that can also optionally heat compartments would be an even greater improvement.

DETAILED DESCRIPTION

Figure 1:
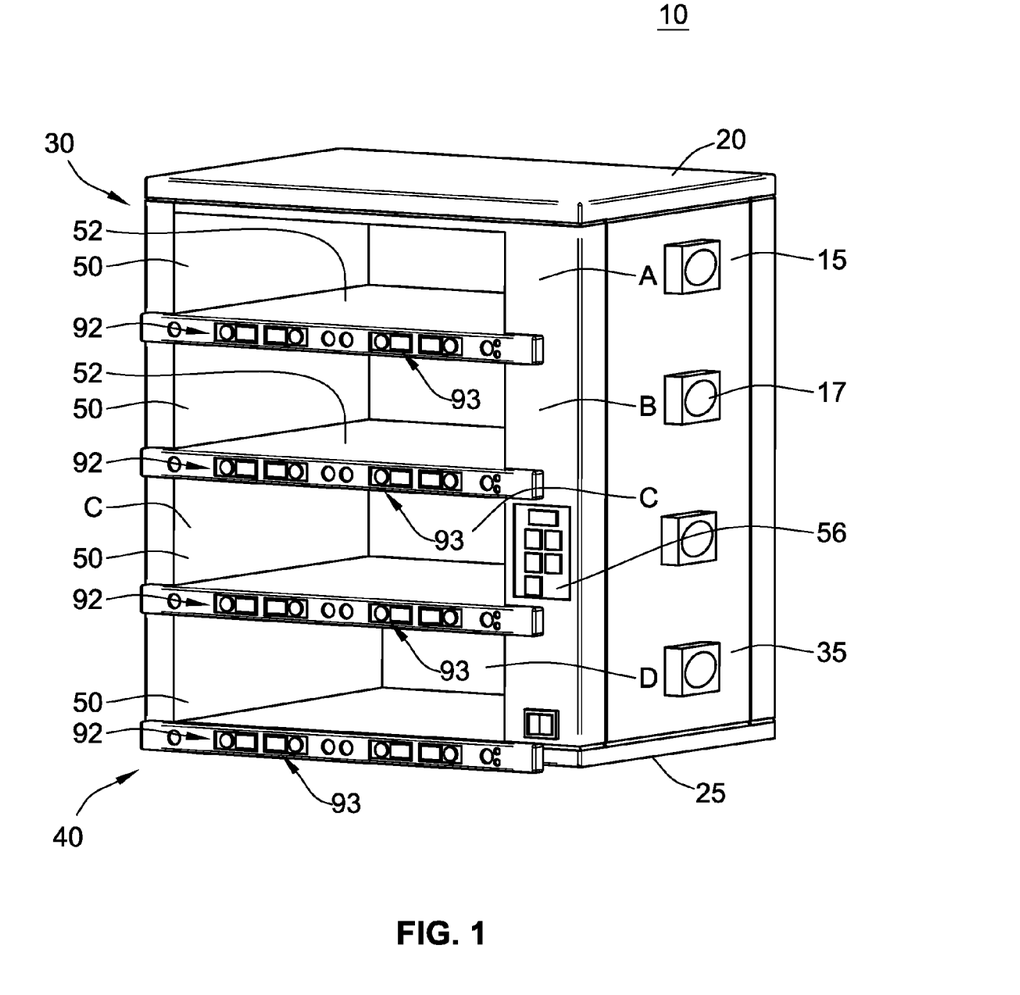
FIG. 1 is a perspective view of refrigerated point-of-use holding cabinet.

FIG. 1 is a perspective view of a refrigerated point-of-use holding cabinet 10 having four separate food holding compartments 50. In one embodiment of the cabinet 10, all of the compartments 50 are refrigerated. In another embodiment, some compartments 50 are refrigerated while other compartments are heated. In yet another embodiment, one or more compartments can be selectively heated or refrigerated.

Cabinet embodiments that have both refrigerated and heated compartments are referred to herein as being dual-mode cabinets. Compartments 50 that can be optionally refrigerated or heated are referred to as dual-mode compartments.

Each embodiment of the cabinet 10 is comprised of a chassis 15. The chassis 15 is comprised of a top panel 20, a bottom panel 25, left-side panel 30, right side panel 35, an open front face 40 and an open rear face 45, which is not visible in FIG. 1. The panels are preferably insulated to reduce heat transfer between the interior of the cabinet 10 and air surrounding the cabinet 10.

As mentioned above, the cabinet 10 illustrated in FIG. 1 is sized, shaped and arranged to have four compartments 50, however, the cabinet can have any number of temperature-controlled compartments, including a single compartment. For clarity, the four compartments 50 depicted in the figures are denominated using the letters A, B, C and D. The "A" compartment is the top or uppermost compartment; the "D" compartment is the bottom or lower-most compartment 50.

Cabinet compartments 50 that are refrigerated use one or more of the heat-sinking devices described below. Compartments 50 that are heated use one or more heat-sources described below.

In FIG. 1, the top or "A" compartment is defined by the left and right sidewalls 30 and 35, the chassis top panel 20 and the first or upper-most shelf 52. Compartment B is defined by the two sidewalls 30 and 35, the shelf 52 for the "A" compartment and the second shelf 52, which is for the "B" compartment. Compartment D is defined by the two sidewalls 30 and 35, the third shelf, which is for the "C" compartment, and the chassis bottom 25. In cabinet embodiments having only one compartment 50, the single compartment is defined by opposing, left and right sidewalls 30 and 35, a chassis top panel 20 and a chassis bottom panel 25. For brevity, cabinet construction and operation is described with regard to a cabinet 10 having four compartments.

The shelves 52, which define compartments, are planar or at least substantially planar and supported in the chassis 15 at their opposing side ends by the two chassis side walls 30 and 35. Food items can be placed onto a shelf 52 and removed from a shelf through the open front face 40 or through the open rear face 45. In one alternate embodiment, which is not shown but readily understood by those of ordinary skill, the rear face 45 is closed. Having a closed rear face 45 reduces heat transfer between the interior of the cabinet 10 and the ambient environment but at the cost of restricted access to the cabinet interior via the open front face 40.

A face plate or bezel 92 is attached to each of the shelves 52 but can also be attached to the sidewalls 30 and 35 of the chassis 15. In cabinet embodiments having only one compartment 50, the bezel 92 is attached to either the top or bottom panels of the cabinet.

The bezels 92 provide information-bearing displays and user-controls, which are collectively identified by reference numeral 93. The bezels 92 also cover heat-sinking devices and heat sources, described below, which are located "inside" the shelves 52.

Displays and user-controls 93 are grouped together in the bezels 92 for corresponding compartments 50. The displays and controls 93 provide a user interface to one or more controlling computers (not shown) for the cabinet. At least one computer (not shown) has a control panel 56 accessible at the front face 40, through which commands can be sent to the computer and from which, operational information can be obtained by a user.

Cabinet control and control of the cabinet shelf temperature is effectuated in part by using one or more microcontrollers or microprocessors in combination with temperature sensors. The Applicant's co-pending patent application entitled "Food Holding Cabinet Power Supplies with Downloadable Software," filed on Nov. 16, 2009 and having U.S. application Ser. No. 12/618,957 discloses among other things, apparatuses and methods by which compartments of a food holding cabinet can be controlled using microprocessors having downloadable software. Compartment temperature control is preferably effectuated using a semiconductor temperature sensor, thermally coupled to each shelf and electrically connected to a processor, such as those disclosed in the co-pending application Ser. No. 12/618,957.

A semiconductor apparatus and method for measuring temperature of a plate or shelf in a food holding cabinet is disclosed in the Applicant's co-pending patent application identified by U.S. patent application Ser. No. 12/759,760 filed on Apr. 14,2010, now, U.S. pat. No. 8,247,745, which is entitled "Temperature Sensor for a Food Holding Cabinet" the content of which is incorporated by reference herein in its entirety.

Figure 2:
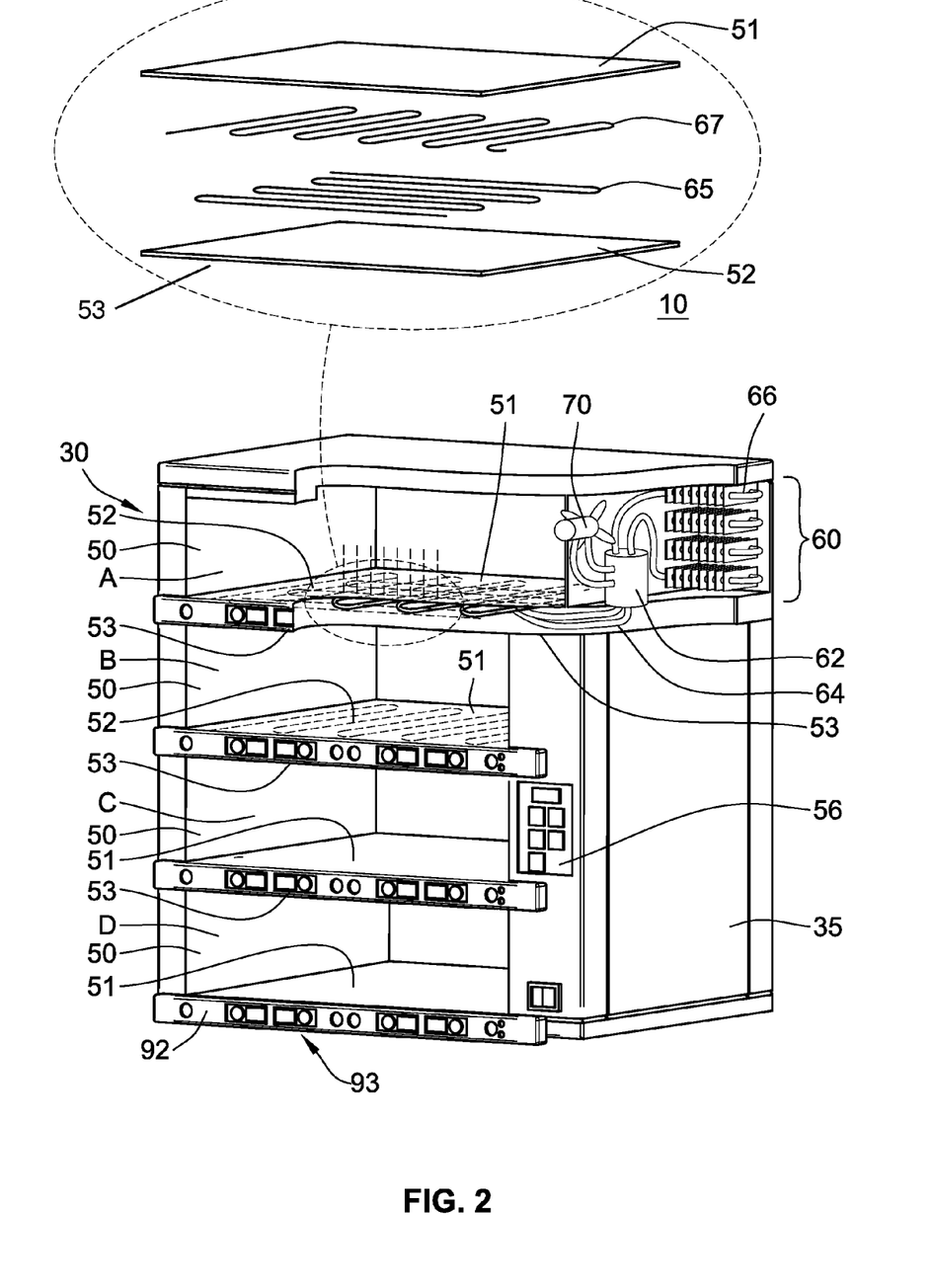
FIG. 2 is a cutaway view of the point-of-use holding cabinet shown in FIG. 1, but which can also provide heat to a compartment.

FIG. 2 is a cutaway view of one embodiment of a point-of-use holding cabinet 10 and includes an inset figure showing in greater detail, a preferred structure for a shelf 52. Referring to the inset, a preferred embodiment of the shelf 52 is comprised of two separate thermally conductive plates or sides 51 and 53. The sides 51 and 53 are spaced apart from each other by a distance sufficient to accommodate the inclusion of at least one heat transfer device, between the plates 51 and 53 and which are depicted in the figures as separate boustrophedonic-shaped, heat transfer devices 65 and 67, respectively.

A first thermally-conductive top plate or side of the shelf 52 is identified by reference numeral 51. A second thermally-conductive bottom plate or side of the shelf 52 is identified by reference numeral 53. The thermally-conductive plates 51 and 53 are preferably made of aluminum, between about one-eighth and about one-quarter inch-thick. Alternate embodiments of the shelf 52 use a thermally-conductive panel made of glass-ceramic or an ultra-low expansion glass for one or both of the plates 51 and/or 53. Glass-ceramics and ultra-low expansion glass are considered herein to be "good" thermal conductors in that their conduction of heat energy is localized. Such materials also make excellent shelves for a heated, point-of-use food holding cabinet because they permit localized areas of a shelf to be heated to a first temperature, without having the entire shelf reach the same temperature.

Regardless of the material from which a shelf plate is made, a refrigeration coil 65 is "sandwiched" between the plates 51 and 53 and in thermal communication with at least one of them by virtue of the coil's mechanical attachment thereto. The coil 65 can be "mechanically" attached to a plate 51 or 53 by a thermally-conductive adhesive. The coil 65 can also be attached by brackets or clamps that are themselves attached to a plate by screws. One particular alternate embodiment of a shelf 52 is comprised of only one, thermally-conductive plate 51, the smooth top surface of which "faces" into a compartment 50 space located above the plate 51. The refrigeration coil 65 is nevertheless attached to and in thermal communication with the bottom surface of the one plate 51. The coil 65 and the mechanism by which it is attached to a plate is left "exposed" to a second compartment 50 located below the plate 51.

In another embodiment of the shelf 52, an electrically-insulated, electrically-resistive heater wire 67 is also sandwiched between the plates 51 and 53 with a refrigeration coil 65. In such an embodiment, the heater wire 67 can be located above, below or substantially co-planar with the refrigeration coil 65 but preferably in thermal communication with at least one of the plates 51 and 53 such that when the wire 67 temperature rises due to an electric current flow, it provides heat energy into the plates 51 and/or 53, to which the wire 67 is thermally coupled to. Those of ordinary skill will recognize that thermally insulating the heater wire 67 from one of the plates, 51 or 53 and thermally insulating the refrigeration coil 65 from the other plate 53 or 51, enables the wire 67 to provide heat energy into one plate 53 or 51, while the refrigeration coil 65 sandwiched between the same two plates absorbs heat from the other plate 51 or 53. Conversely, thermally coupling the heater wire 67 and the refrigeration coil 65 to the same plate 51 or 53, or coupling them to both plates 51 and 53, enables the corresponding plate or plates to be heated or cooled by the selective actuation of either a refrigeration system for the evaporator coil 65, or a power supply for the wire 67.

The cabinet embodiment shown in FIG. 2 uses one or more conventional, liquid phase/vapor phase refrigeration systems 60 connected to the evaporator coil 65 inside a shelf 52. Such systems 60 are also known to those of ordinary skill in the art as a "gas refrigeration cycle" and/or a "reversed Brayton cycle." They are comprised of a gas compressor 62, an evaporator 65, refrigerant lines 64, a fan 70, a pressurized refrigerant gas working fluid, and a condenser coil 66. Providing a separate system 60 in the cabinet 10 for each shelf 52, enables corresponding shelves 52 to be maintained at different refrigerated temperatures, i.e., it provides or facilitates individual shelf temperatures. In an alternate embodiment, a single system 60 refrigerates coils 65 fop all shelves 52 in a cabinet. In such an embodiment, temperatures of different shelves can be optionally (or alternatively) "controlled" individually by the addition of heat to a shelf, from a shelf-embedded heater wire 67.

For purposes of clarity, the evaporator coil 65 is considered to be a heat-sinking device in that it removes or "sinks" heat from compartments 50 in the cabinet 10. The working fluid that flows through the evaporator coil 65 also removes or sinks heat from evaporator coil 65 and as a result, from the compartments 50 as well. The working fluid is thus also considered to be a heat-sinking device. The entire gas refrigeration system 60 can also be considered as a structure or device that removes or sinks heat from compartments 50 in the sense that the gas refrigeration system 60 would not be functional without the various components that make up such a system.

Figure 5:
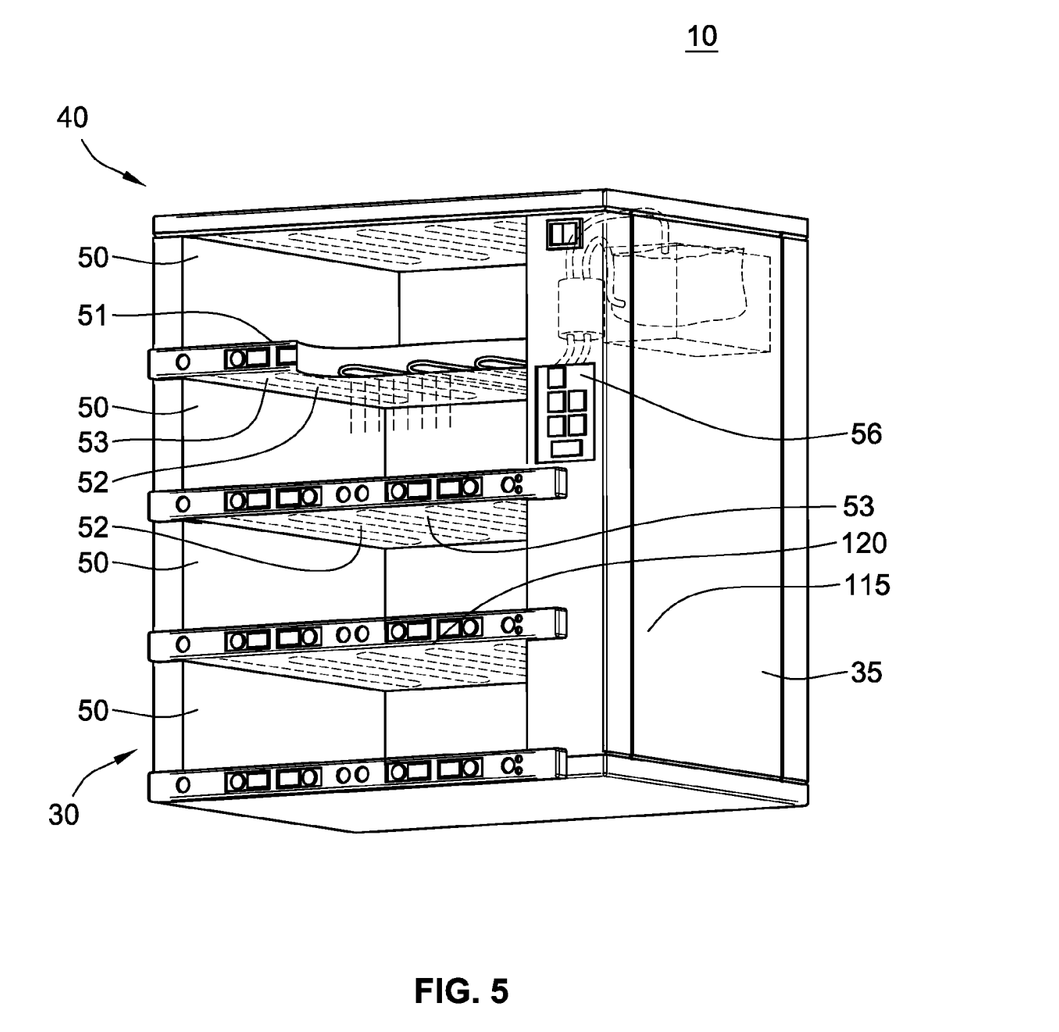
FIG. 5 is another perspective view of an alternate embodiment of a refrigerated point-of-use holding cabinet.

Those of ordinary skill will appreciate that a refrigerated compartment 50 is one that can have a refrigerated shelf 52 above, below or both above and below the compartment space albeit with the preferred location of the refrigerated shelf 52 being at the top of a compartment, as shown in FIG. 5. Depending in part on the refrigerated shelf location in a refrigerated compartment, heat energy from a food product within a compartment 50 will be conducted, radiated and/or carried by convection, into thermally-conductive shelf surfaces embodied by the aforementioned shelf plates 51 and 53. Regardless of where a refrigerated surface is located in a compartment, heat energy in a shelf plate 51 and/or 53, is eventually transferred into the coil 65. Heat absorbed by refrigerant flowing through the coil 65 is eventually transferred to the air from the condenser 66.

A heated compartment 50 can have a heated shelf above, below or above and below a compartment space. Heat energy from a heater wire 67 in a shelf is transferred into one or both of the thermally-conductive shelf plates 51 and 53. As the shelf plates' temperature rises, heat energy is of course transferred into the corresponding, adjacent compartment 50 as well as anything stored therein.

The liquid phase/vapor phase refrigeration system 60 shown in FIG. 2 is just one way to refrigerate a compartment 50 of the cabinet 10. An alternate embodiment of a shelf and an alternate embodiment of a cabinet use the thermoelectric effect provided by one or more Peltier devices 80 to cool and/or heat one or more components of one or more compartments 50.

The thermoelectric effect is a well-known direct conversion of a temperature difference into an electric voltage and vice versa. When a voltage is applied to a thermoelectric device, a temperature difference is created across the two sides of the device. The temperature difference created in response to an applied voltage is known as the Peltier effect. Devices that produce temperature differences in response to an applied voltage are considered herein to be Peltier devices. A Peltier device 80 is therefore considered herein to be a heat-sinking device, however, a Peltier device 80 can also be a heat source.

Peltier devices have a "cold" side and a "hot" side. The cold side absorbs heat whereas the hot side emits heat. Heat emitted from the hot side includes at least some of the heat absorbed from the cold side. Dissipating heat from the hot side thus facilitates heat absorption by the cold side. A Peltier device 80 is therefore considered herein to be a solid-state heat pump or heat-sinking device.

Figure 3A:
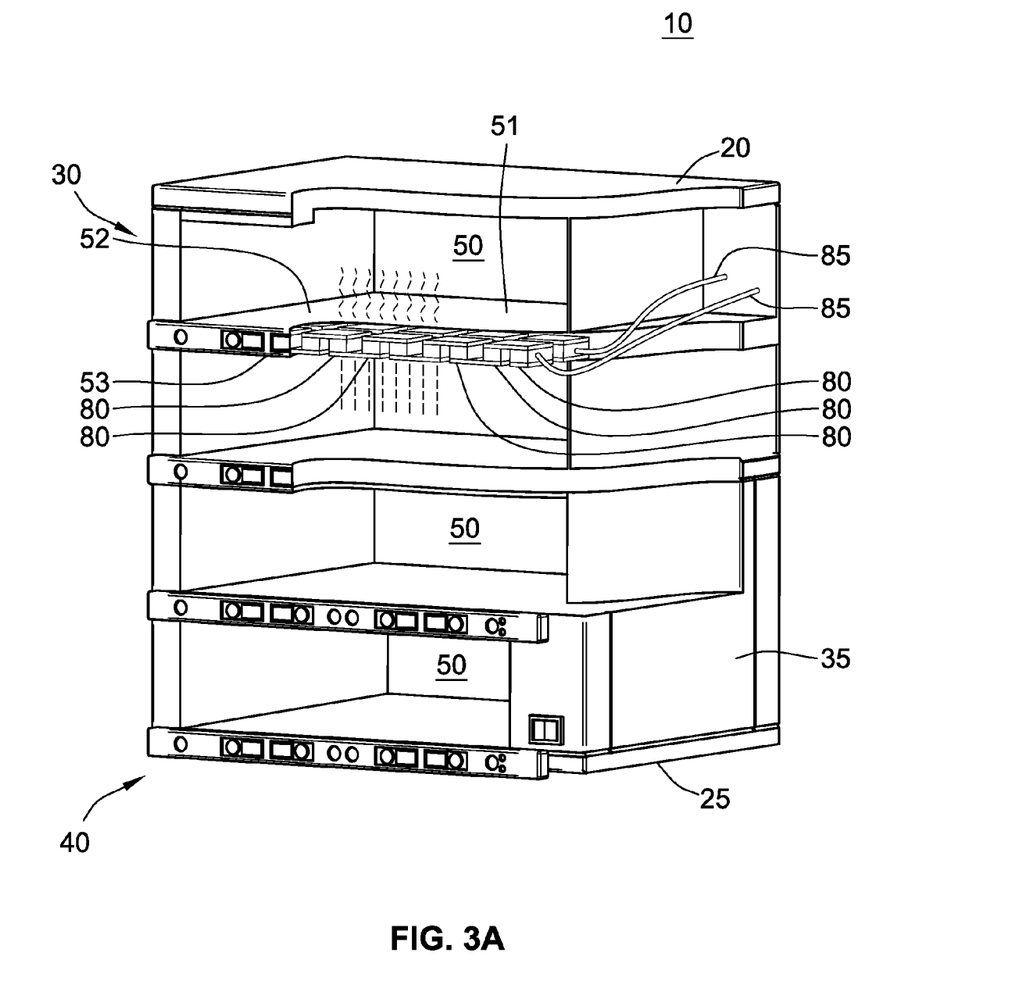
FIG. 3A is a cutaway view of an alternate embodiment of a point-of-use holding cabinet having refrigerated and heated compartments.

FIG. 3A is a cutaway view of another embodiment of a point-of-use holding cabinet using Peltier devices to absorb heat from compartments 50. In a preferred embodiment, one or more Peltier devices 80 are "sandwiched" between, and in thermal communication with shelf plates 51 and/or 53 described above. Electrical energy is provided to the Peltier devices 80 through wires 85, under the control of the aforementioned control computer.

The polarity of the voltage provided to a Peltier device determines which side of the device 80 is "cold." In one embodiment of the cabinet shown in FIG. 3, the hot sides of all the Peltier devices 80 are oriented toward, and thermally-coupled to, one compartment, such as the "A" compartment, (See FIG. 1). The cold sides of the same Peltier devices 80 are oriented toward, and thermally-coupled to, the lower or "B" compartment. (See FIG. 1) Peltier devices 80 sandwiched "inside" the shelf 52 thus sink, i.e., absorb, heat energy from the B compartment while simultaneously adding heat energy to the A compartment.

"Sandwiching" the Peltier devices in a shelf 52 comprised of two plates 51 and 53 as shown in FIG. 3 provides a shelf 52 cold on one side and hot on the other. Such a shelf 52 structure thus enables a dual-mode refrigerated point-of-us holding cabinet 10 having a "first" compartment 50 that is warm and a vertically adjacent "second" compartment 50 that is cold.

As mentioned above, the opposite sides of a Peltier device are hot or cold depending on the polarity of the voltage provided to the device. Designating one compartment as cold and an adjacent compartment as hot is therefore a design choice because the thermal orientation of the Peltier device can be reversed simply by changing the polarity of the voltage provided to the Peltier device.

Temperature control of a thermoelectric, Peltier device 80 is typically accomplished by controlling the electric energy provided to the device. Temperature control of one side of the Peltier device 80 can also be effectuated by controlling heat transferred into or out of the opposite side of the device, as described in the applicant's co-pending application Ser. No. 12/478,480 filed Jun. 4, 2009, the disclosure of which is entitled Thermo Electric Cooler.

The contents of application Ser. No. 12/478,480 are incorporated herein by reference, and as described therein, Peltier device cold side temperature control is effectuated in one embodiment of a cabinet 10 by controlling the hot side heat dissipation. Hot side heat dissipation is controlled in the cabinet 10, in part by exhaust fans 17, which are themselves controlled by the aforementioned cabinet controllers.

In another embodiment of a point-of-use holding cabinet, multiple Peltier devices 80 are mounted between shelf plates 51 and 53 but have only their cold sides thermally coupled to one of the two opposing plates 51 and 53. Air is then moved through the inter-plate space to cool the hot sides of the Peltier devices therein.

Figure 3B:
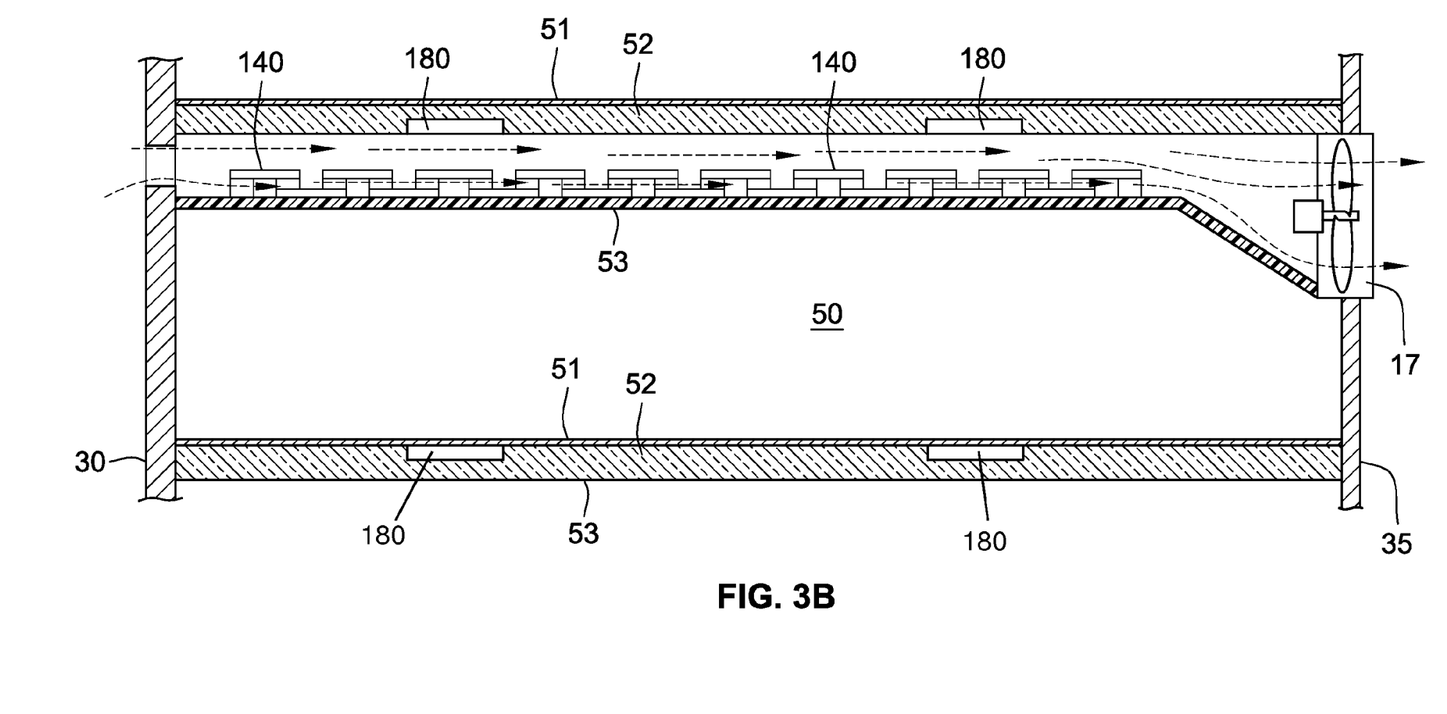
FIG. 3B is a cross-sectional view through one compartment of the cabinet shown in FIG. 3A.

FIG. 3B is a cross-sectional view through one compartment of an alternate embodiment shelf 52 used in the aforementioned embodiment of a food storage cabinet. As can be seen in FIG. 3B, the Peltier devices' 80 cold sides are thermally coupled to the bottom or lower plate 53 of a shelf 52. Heat is absorbed by the Peltier devices 80 cold sides, which cause the temperature of the associated plate 53 to decrease. As the plate 53 temperature decreases, heat is absorbed into the plate 53 and thermally conducted into the Peltier devices 80. Heat energy from the hot sides of the Peltier devices is subsequently conducted, radiated and/or carried by convection, into air drawn through the inter-plate space by a fan 17 mounted into the side 35 of the cabinet. A Peltier device 80 and the plate 53 chilled by one or more such devices are both considered herein to be heat-sinking devices.

Temperature control of the cabinet compartments that are refrigerated by using Peltier devices can be accomplished using the methodology disclosed in the Applicant's co-pending application Ser. No. 12/478,480 and by the cabinet exhaust fans 17 depicted in FIG. 1 and FIG. 3B, which move air through the inter-plate space, i.e., the space between the plates 51 and 53. Moving relatively cool room air over the Peltier devices' hot sides thus enables temperature control of the cold sides, but it also enables an alternate embodiment of the cabinet wherein two or more vertically-adjacent compartments 50 can be kept cool or cold using only Peltier devices as heat-sinking devices, within the shelves 52, such as the shelf 52 shown in FIG. 2B.

Figure 4:
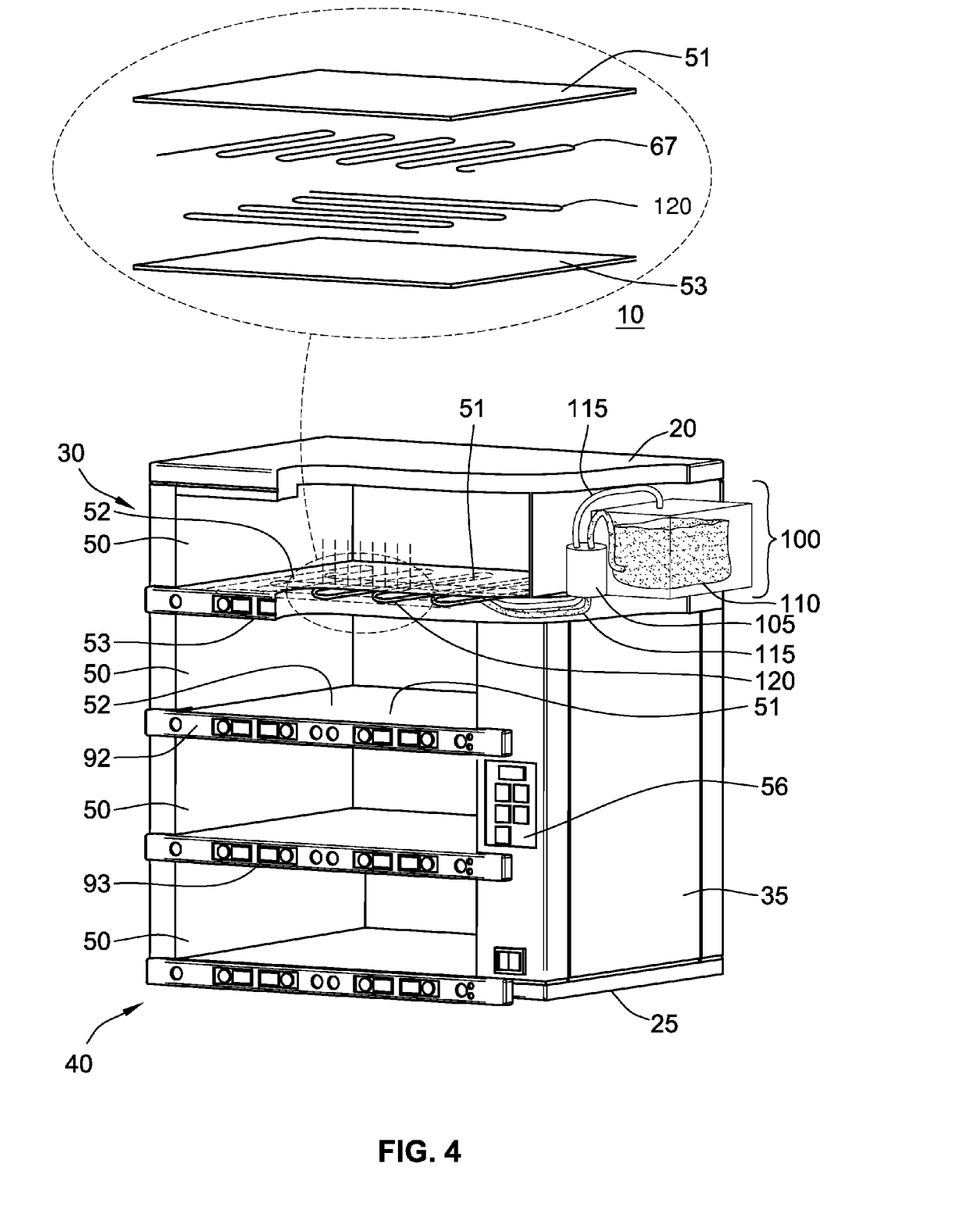
FIG. 4 is a cutaway view of an alternate embodiment of a refrigerated holding cabinet that also provides heated compartments.

FIG. 4 is a cutaway view of yet another alternate embodiment of a holding cabinet 10. The cabinet in FIG. 4 effectuates refrigeration of one or more compartments 50 using a chilled or refrigerated, circulating liquid such as oil or glycol that is pumped through one or more thermally-conductive coils 120 sandwiched inside one or more shelves 52 and which are thermally coupled to one or both of the plates 51 and 53. Unlike a liquid-phase/vapor-phase refrigeration system that uses a working fluid, such as R-134 and the like, which changes phase as it circulates, and, the selective routing to different evaporators is problematic, the system of FIG. 4 uses a chilled liquid that does not change phase and which is moved through the heat-exchanging coil 120 and connecting conduit tubes by a pump; the pressure on the liquid is therefore much lower than the working pressures required in a liquid-phase/vapor-phase refrigeration system, typically a few pounds per square inch or only an amount sufficient to overcome head losses.

As with the shelf described above with regard to FIG. 2, an alternate embodiment of the shelf 52 used with the cabinet of FIG. 4 uses a single plate 51 with the heat-exchanging coil 120 attached to the lower or bottom surface of the single plate 51 such that the coil 120 is thermally-coupled to the one plate 51 and exposed to a compartment below the single plate 51. In both shelf embodiments, i.e., one and two-plate shelves, the thermally-conductive coil 120 is considered to be a heat-sinking device as is the chilled liquid it carries.

Using a chilled liquid as a heat-sinking "device" enables the cabinet 10 to controllably and selectively refrigerate compartments 50 simply by routing the chilled liquid through various different coils 120 that are thermally coupled to various different plates 51 and/or 53 that comprise different shelves 52 in various different compartments 50. Using a chilled liquid also facilitates a selective heating of the same compartments by heating the liquid instead of refrigerating it. And, as depicted in the inset of FIG. 4, an electrically resistive heater wire 67 sandwiched between two plates 51 and 53 with the cooling coil 120 enables such shelves to selectively heat or cool compartments above and/or below the shelf, depending on which "side" of the shelf the heater wire 67 is thermally coupled to as well as the temperature of the liquid flowing through the "sandwiched" coil 120.

In FIG. 4, a working liquid such as oil or glycol is refrigerated in a small tank 110 mounted to one side of the stack of compartments A-D but within the chassis 15. The liquid can be chilled by a conventional liquid-phase/vapor-phase refrigeration system, such as the system 60 described above. A pump 105 circulates the working fluid between the tank 110 and coil 120 through flexible pipes or tubes 115. Heating the working fluid inside the tank 110 instead of refrigerating it also enables the re-circulating liquid to be alternately used to heat the shelves 52. A working fluid, such as the aforementioned oil or glycol, is considered to be "chilled" or "refrigerated" when its temperature entering a cooling coil 120 is at least twenty (20) degrees Fahrenheit (F) below ambient temperature. By way of example, if the ambient temperature of a room where a cabinet 10 is used is seventy degrees Fahrenheit, the liquid entering a cooling coil 120 is "chilled" or "refrigerated" if its temperature is fifty degrees Fahrenheit or less.

FIG. 5 is another perspective view of the refrigerated point-of-use holding cabinet and shows primarily the preferred location for cooling coils and/or refrigerated shelves in each embodiment, which is at the top of each compartment 50 where warmer air in the compartment aggregates.

As used herein, the term heat-sinking device includes the aforementioned cooling coils, regardless of the type of working fluid therein. A heat-sinking device also includes devices and the ancillary equipment attached to, and used with the cooling coils. Peltier devices are also considered to be heat sinking devices. Heat-sinking devices also include Peltier devices.

Heat sources include the electrically-resistive heating elements, heated coils and devices and ancillary equipment that provide heat to a working fluid. As described above, Peltier devices are also considered to be heat sources.

Heat sinking devices and heat sources are considered herein to be more generally referred to as heat transfer devices.

The heat transfer devices disclosed herein are thermally coupled to the shelf 52, preferably by way of mechanical attachment to at least one of the plates 51 and 53. Mechanical attachment and the resultant thermal coupling is preferably accomplished by a thermally-conducive adhesive, however, clamps that are attached to a plate by screws driven into a plate can also be used.

The shelves are mechanically coupled to the side panels 30 and 35. The side panels are also preferably made from thermally-conductive material such as aluminum. Thermally coupling a heat transfer device to a one or more plates that comprise a shelf therefore also thermally couples the heat transfer device to the side walls and thus to the compartment. Heat transfer devices coupled to a shelf are therefore also thermally coupled to the corresponding compartment.

While the temperature of a Peltier device can be controlled by controlling the heat dissipated from the hot side and/or the heat absorbed into the cold side, cabinet embodiments disclosed herein preferably control compartment temperature using one or more semiconductor temperature sensors, thermally coupled to one or more of the thermally-conductive structures that comprise a compartment. Cabinet embodiments disclosed herein preferably use a semiconductor temperature sensor 180 that is directly coupled and therefore thermally coupled to the refrigerated and/or heated surfaces 51 and/or 53 of the shelves 52. FIG. 3B, which is a cross-sectional view through one compartment of the cabinet shown in FIG. 3A, depicts a first, semiconductor temperature sensor 180 attached to the lower side 53 of the "upper" shelf 52 and second, semiconductor temperature sensor 180 attached to the upper side 51 of the "lower" shelf 52.

Semiconductor temperature sensors 180 used in preferred embodiments disclosed herein are disclosed in the applicant's co-pending patent application Ser. No. 12/759760, filed Apr. 14, 2010 and which is entitled "Temperature Sensor for a Food Holding Cabinet." The contents of that application are incorporated by reference herein in its entirety especially the teachings of the structure and use of a semiconductor temperature sensor.

The foregoing description is for purposes of illustration only and not for purposes of limitation. The true scope of the invention is set forth by the appurtenant claims.

What is claimed is:

1. A dual mode point-of-use, food holding cabinet comprising:
   a chassis having a front face and an opposing rear face;
   a first food holding compartment within the chassis, the first food holding compartment having first and second openings, the first opening being open, uncovered and located at the front face of the chassis, the second opening being open, uncovered and located at the rear face of the chassis, the first and second openings being configured to allow food items to be placed into and removed from the first food holding compartment;
   a second food holding compartment within the chassis, the second food holding compartment having first and second openings, the first opening of the second food holding compartment being open, uncovered and located at the front face of the chassis, the second opening of the second food holding compartment being open, uncovered and located at the rear face of the chassis, the first and second openings of the second food holding compartment being configured to allow food items to be placed into and removed from the first food holding compartment;
   a shelf located between and defining the first and second food holding compartments, the shelf comprising a first side and a second side, the first side facing into the first food holding compartment, the second side facing into the second food holding compartment;
   a first refrigeration coil located between the first and second sides of the shelf, the first refrigeration coil being thermally insulated from one of the first side and the second side;
   a first electrically resistive wire located between the first and second sides of the shelf, the first electrically resistive wire being thermally insulated from the other one of the first side and the second side; and
   a controller operatively coupled to the first refrigeration coil and to the first electrically resistive wire, the controller being configured to operate the first refrigeration coil and the first electrically resistive wire simultaneously to absorb heat from one of the first side and the second side and to provide heat to the other of the first side and the second side;

wherein each of the first and second food holding compartments can be selectively heated or cooled.

2. The food holding cabinet of claim 1, further comprising:
a vapor-phase/liquid-phase refrigeration system operatively coupled to the first refrigeration coil and wherein at least one of the first and second food holding compartments can be cooled by activation of the vapor-phase/liquid-phase refrigeration system.

3. The food holding cabinet of claim 1, wherein at least one of the first side and second side of the shelf is made of a glass-ceramic.

4. The food holding cabinet of claim 1, further comprising a refrigerated liquid, which is circulated through the first refrigeration coil.

5. The food holding cabinet of claim 1, further comprising:
a transistor comprising a P-N junction, the transistor being coupled to at least one of the first food holding compartment and the second food holding compartment, the transistor being configured to effectuate control of the temperature of the at least one of the first food holding compartment and the second food holding compartment by a calculation of the P-N junction's temperature from a measurement of a voltage across the P-N junction.

6. The food handling cabinet of claim 5, wherein the temperature sensor is thermally coupled to the first compartment.

7. The food holding cabinet of claim 1, wherein the first compartment is located in the chassis, below the second compartment.

8. The food holding cabinet of claim 7, wherein the shelf is comprised of ultra-low expansion glass.

9. The food holding cabinet of claim 7, wherein the heat-sinking device is a comprised of a refrigerated liquid.

* * * * *